US011491563B2

(12) United States Patent
Butcher et al.

(10) Patent No.: US 11,491,563 B2
(45) Date of Patent: Nov. 8, 2022

(54) CUTTING SYSTEMS AND RELATED METHODS

(71) Applicants: Trent N. Butcher, Sandy, UT (US); Larry A. Butcher, Sandy, UT (US)

(72) Inventors: Trent N. Butcher, Sandy, UT (US); Larry A. Butcher, Sandy, UT (US)

( * ) Notice: Subject to any disclaimer, the term of this patent is extended or adjusted under 35 U.S.C. 154(b) by 101 days.

(21) Appl. No.: 17/069,266

(22) Filed: Oct. 13, 2020

(65) Prior Publication Data

US 2022/0111453 A1 Apr. 14, 2022

(51) Int. Cl.
*B23D 47/02* (2006.01)
*B23D 47/12* (2006.01)
*B23D 47/04* (2006.01)
*B23D 45/06* (2006.01)

(52) U.S. Cl.
CPC ......... *B23D 47/025* (2013.01); *B23D 45/062* (2013.01); *B23D 47/04* (2013.01); *B23D 47/123* (2013.01)

(58) Field of Classification Search
CPC .... B23D 47/025; B23D 45/062; B23D 47/04; B23D 47/123; B23D 55/04; B23D 55/02; B23D 51/043; B23D 47/045; B23D 45/068; B23D 45/06; B23D 33/00; B23D 47/042; B26D 2007/1809; B26D 7/1818; B26D 7/18; B21D 45/00
See application file for complete search history.

(56) References Cited

U.S. PATENT DOCUMENTS

| | | | | |
|---|---|---|---|---|
| 3,246,675 A | * | 4/1966 | Sweetser | B27B 31/08 83/438 |
| 3,866,502 A | * | 2/1975 | Brewer, Sr. | B27B 5/063 83/447 |
| 4,418,594 A | * | 12/1983 | Burns, Jr. | B29B 17/02 100/902 |
| 9,403,224 B1 | * | 8/2016 | Silva | B23D 47/025 |
| 2003/0051720 A1 | * | 3/2003 | Bradfield | B27B 27/02 125/13.01 |

(Continued)

FOREIGN PATENT DOCUMENTS

DE 10208489 A1 9/2003
SU 83822 A1 10/1950

(Continued)

OTHER PUBLICATIONS

International Search Report and Written Opinion Received from PCT Application No. PCT/US2021/052943, dated Jan. 14, 2022, 10 Pages.

*Primary Examiner* — Evan H Macfarlane
*Assistant Examiner* — Liang Dong
(74) *Attorney, Agent, or Firm* — Bretton L. Crockett; TechLaw Ventures, PLLC

(57) ABSTRACT

In some embodiments, a cutting system including a movable blade operably coupled to a motor is disclosed, wherein the cutting system comprises a diverting feature. In some embodiments, a diverter proximity relative to the movable blade is selected to facilitate diversion of a material during cutting. In at least one embodiment, the movable blade may be a circular blade or a reciprocating blade with a thickness of less than 3/32 of an inch. A cutting system according to the present invention may be coupled to a container, for example, a residential trash container or a residential recycling container.

20 Claims, 14 Drawing Sheets

(56) References Cited

U.S. PATENT DOCUMENTS

2012/0216665 A1* 8/2012 Gass ..................... B27B 5/29
83/440.2

FOREIGN PATENT DOCUMENTS

| SU | 1614841 A | 12/1990 |
|---|---|---|
| WO | 2005000546 A1 | 1/2005 |
| WO | 2013168028 A2 | 11/2013 |

* cited by examiner

CUTTING SYSTEMS AND RELATED METHODS

BACKGROUND

With an increasing dependence on e-commerce, families and individuals are receiving an increasing amount of packaging (e.g., cardboard and other packaging), disposal of which may be difficult and time consuming.

Conventional cutting systems (e.g., saws, razor knives, etc.) generally relate to construction type tools, hand tools, and hobby-related devices. Such conventional devices all have certain disadvantages when employed to reduce the size of materials formed from sheets, such as, for example, cardboard boxes. Accordingly, there exists a need for improved cutting systems.

SUMMARY

The invention relates to a cutting system including at least one movable blade configured to cut materials during operation. In some embodiments, a cutting system including a movable blade operably coupled to a motor is disclosed, wherein the cutting system comprises a diverting feature. In some embodiments, a diverting element may be sized and configured to divert a material cut by the movable blade away from an upper surface of a table element. In some embodiments, a diverting feature may be oriented at an angle relative to a table element of the cutting system. In some embodiments, a diverter proximity relative to the movable blade is selected to facilitate diversion of a material during cutting. In at least one embodiment, the movable blade may be a circular blade or a reciprocating blade with a thickness of less than $3/32$ of an inch. A cutting system according to the present invention may be coupled to a container, for example, a residential trash container or a residential recycling container.

The invention also relates to a cutting system including at least one movable blade configured to cut materials, but with limited adjustment. In some embodiments, the thickness and width of a material to be cut may be fixed. Put another way, in some embodiments, a cutting system with a movable blade may have thickness and/or width limits which are not capable of adjustment. For example, a cutting system with a movable blade may include a blade guard, wherein the blade guard is fixed and/or a fence element, wherein the fence element is fixed.

Optionally, a cutting system according to the present invention may be coupled to a container, for example, a residential trash container or a residential recycling container.

Features from any of the disclosed embodiments may be used in combination with one another, without limitation. In addition, other features and advantages of the present disclosure will become apparent to those of ordinary skill in the art through consideration of the following detailed description and the accompanying drawings.

DETAILED DESCRIPTION

Figure 1:
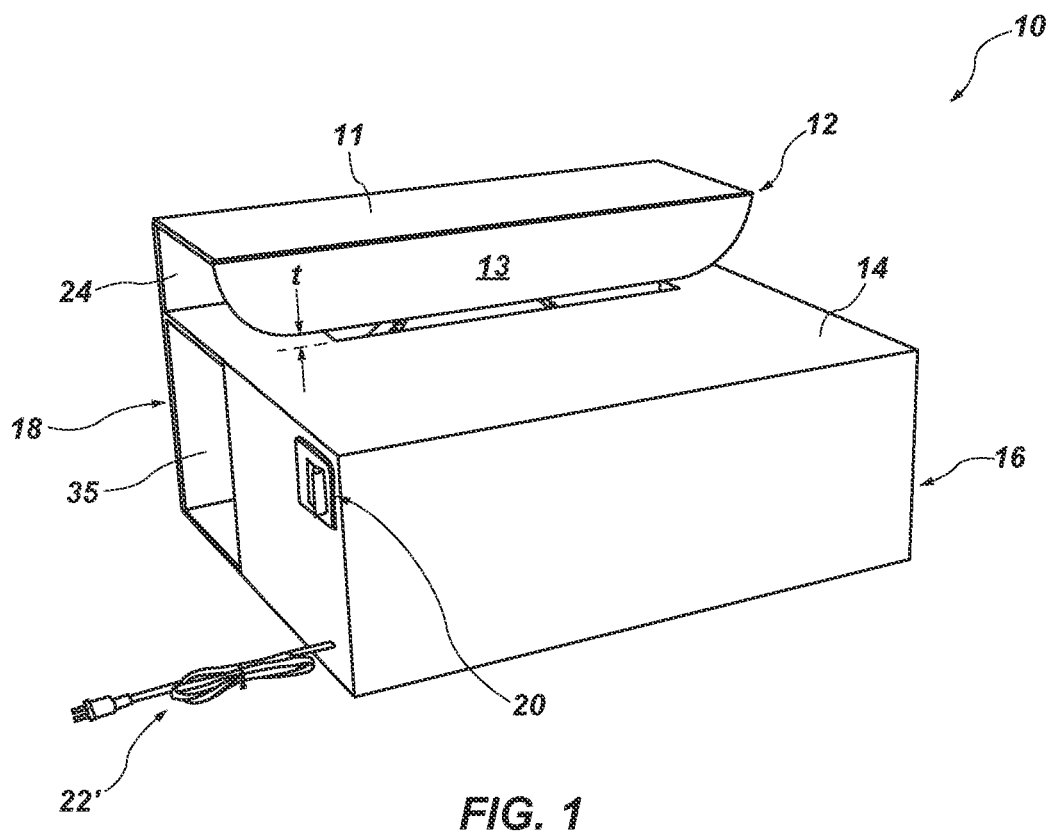
FIG. 1 shows a perspective view of a cutting system.

FIG. 1 shows a perspective view of one embodiment of cutting system 10 configured to cut a portion from a larger sheet of such material. As shown in FIG. 1, in one embodiment, cutting system 10 may include blade guard 12, enclosure 16, side cover 18, and table element 14. Blade guard 12 may comprise top guard 11 and front guard 13. Fence element 24 may be fixed (i.e., not adjustable) and may function to limit the width (e.g., maximum width) of a material to be cut, for example, when a sheet of material is placed upon table element 14 (along the edge positioned away from electrical switch 20 and electrical cord 22) against fence element 24 and moved toward exit opening 35. Front guard 13 may be fixed (i.e., not adjustable) and may limit the maximum thickness (labeled "t") of a material to be cut because it is positioned at a selected distance from the top surface of table element 14, as will be discussed in greater detail herein. Optionally, a so-called "stock guide" or "hold down" device may be attached, for example to guard 13 and configured to hold a material to be cut against table element 14 and/or fence element 24. Such a stock guide may be commercially available from JessEm Tool Company in Ontario, Canada. Furthermore, any so-called "hold down" device as known in the art may be sized and configured to force a material to be cut against table element 14 and/or fence element 24. For example, any device disclosed in U.S. Pat. No. 4,976,298 (the disclosure of which is incorporated herein, in its entirety, by this reference) may be incorporated in a cutting system 10. In one embodiment, table element 14, side cover 18, enclosure 16, and/or blade guard 12 may comprise a sheet of material (e.g., a metal or metal alloy, such as stainless steel, carbon steel, aluminum, or any suitable metal alloy; a polymer, such as plastic, or any other suitable material, without limitation). In further detail, table element 14, side cover 18, enclosure 16, and/or blade guard 12 may be separately formed and joined together or may be formed, where possible, from a common sheet of material, without limitation. Metal treatments, surface hardening, anodizing (of any color, such as, for example, green, red, yellow, blue, clear, gold, etc.) black oxide coatings, or any other surface treatments may be included in or performed on the materials comprising cutting system 10.

Figure 2A:
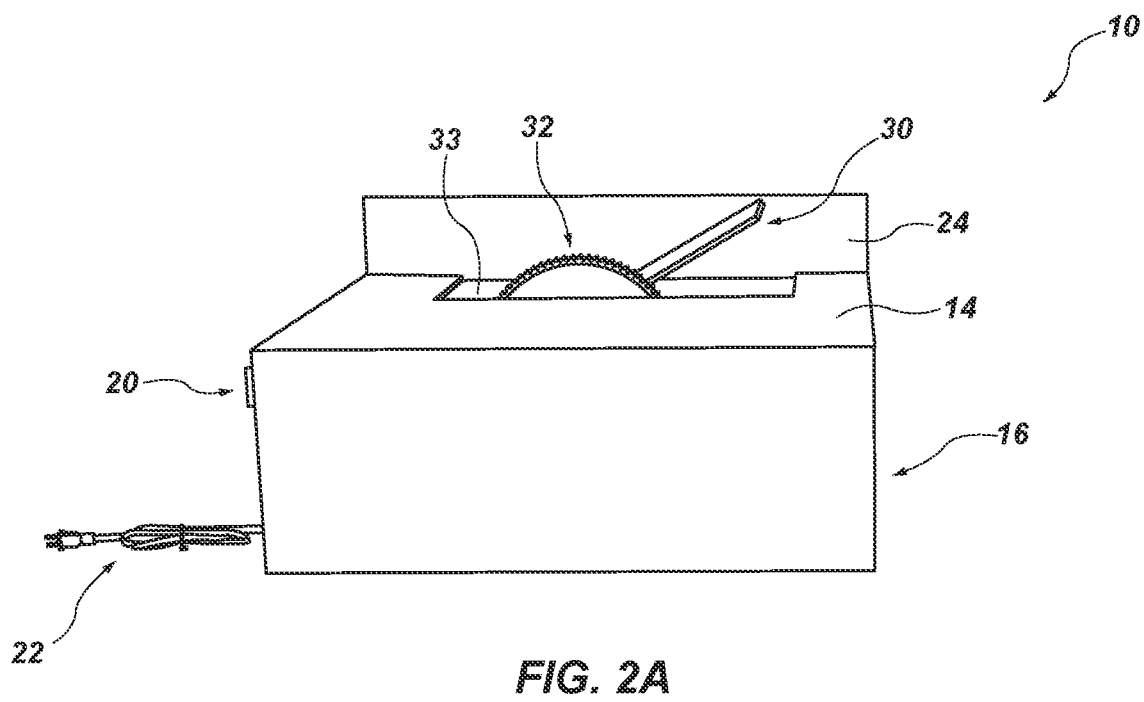
FIG. 2A shows a partial perspective view of the cutting system shown in FIG. 1.
Figure 2B:
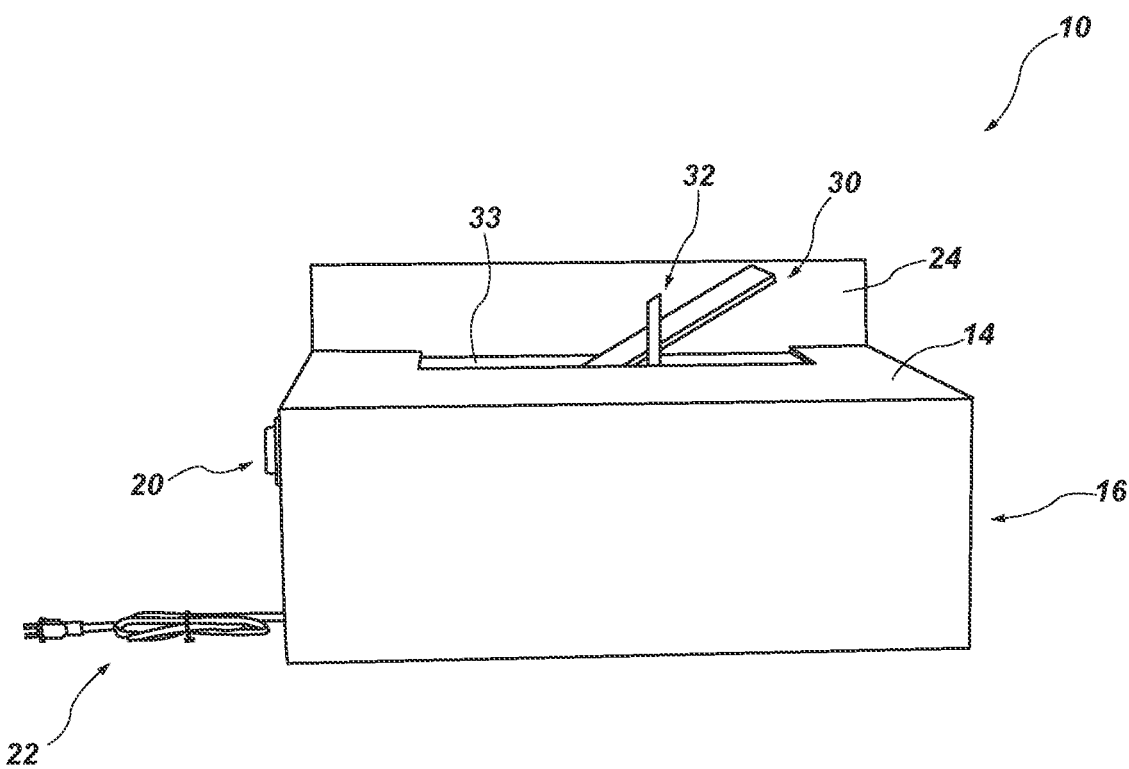
FIG. 2B shows a partial perspective view of a cutting system including a reciprocating blade.

FIG. 2A shows a partial perspective view of an embodiment of the cutting system 10 shown in FIG. 1, where blade guard 12 is not shown. As shown in FIG. 2A, movable blade 32, which is shown as a circular saw blade, may be positioned in opening 33 and may be attached to a motor (not shown). In one embodiment, movable blade 32 may be attached to such motor by attaching a suitable saw blade motor arbor (e.g., a ½ motor arbor, ⅝ inch motor arbor, etc.) to the shaft of the motor. Certain saw blade motor arbors may be commercially available from, for example, Grizzly Industrial, which is headquartered in Bellingham, Wash. Further, diverting feature 30 may be sized, positioned, and/or configured to guide the portion cut from a sheet of material downward toward exit opening 35. FIG. 2B shows a partial perspective view of another embodiment of the cutting system 10, where blade guard 12 is not shown. As shown in FIG. 2B, movable blade 32, which is shown as a reciprocating saw blade, may be positioned in opening 33 and may be attached to a motor (not shown). In one embodiment, movable blade 32 may be attached to such motor by way of a suitable reciprocating assembly (e.g., motor, gear drive, crosshead, etc.). Further, diverting feature 30 may be sized, positioned, and/or configured to guide the portion cut from a sheet of material downward toward exit opening 35.

Although many of the embodiments described herein illustrate movable blade 32 as a circular saw blade, this invention is not so limited. Rather, any movable blade described herein may comprise a reciprocating blade, a rotating blade, or a blade that moves in more than one degree of freedom (e.g., more than one direction, one direction and rotation, etc.), without limitation. In some embodiments, movable blade 32 may comprise a "band saw" blade, where motor is configured to move the band saw blade. In other embodiments, the movable blade and motor may be configured as a "jigsaw", "scroll saw", "rotary saw", or any other configuration, without limitation. Such a movable blade and motor configuration may be operably coupled to a table element, diverting feature, and/or any other component, device, or aspect described herein, without limitation.

Figure 3A:
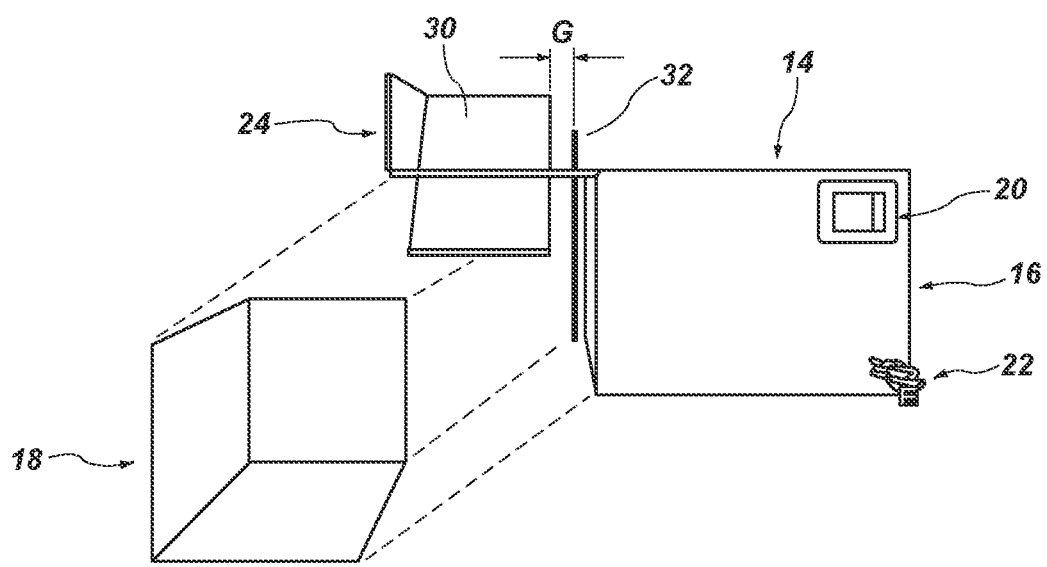
FIG. 3A shows a partial exploded perspective view of the cutting system shown in FIG. 2.

FIG. 3A shows a partial exploded perspective view of the cutting system 10 shown in FIG. 2A. As shown in FIG. 3A, side cover 18 may comprise three sides or walls. In some embodiments, side cover 18 may be configured to be attached and detached from enclosure 16 and/or table element 14. For example, side cover 18 and enclosure 16/table element 14 may be attached to one another via at least one fastening element (not shown). In one embodiment, one fastening element, two fastening elements, three fastening elements, or more than three fastening elements may be positioned at or near the adjacent portions of side cover 18 and the enclosure 16 and/or table element 14. In one example, holes may be formed through side cover 18 and enclosure 16 and/or table element 14, where a fastening element is positioned in each hole. A fastening element may comprise a pin, a threaded fastener (e.g., a sheet metal screw, a bolt, a machine screw, etc.), a rivet, or any other suitable fastening element. Such fastening element may comprise a polymer (e.g., a plastic), a metal, or any other material. In one embodiment, fastening element may comprise aluminum, carbon steel, stainless steel, any metal, or metal alloy. In yet further embodiments, side cover 18, enclosure 16, and/or table element 14 may include complementary features (e.g., tabs and slots) which fit into/onto one another and allow side cover 18 to be attached and detached from enclosure 16 and/or table element 14. Removing side cover 18 may facilitate changing movable blade 32 or removing cut material that does not pass from exit opening 35 during operation of cutting system 10. Further, gap distance G, measured between movable blade 32 and the side surface of diverting feature 30, as shown in FIG. 3A may be selected such that movable blade 32 may be removed and/or replaced. For example, gap distance G may be at least about 0.5 inches, between 0.5 inches and 1 inch, between 1 inch and 2 inches, or greater than 2 inches.

Movable blade 32 may comprise a circular blade. For example, movable blade 32 may comprise a circular saw blade of the type used for circular saws and/or table saws. Certain circular saw blades may be commercially available from home improvement stores and/or hardware/tool stores. In some embodiments, movable blade 32 may comprise scalloped, smooth, knife saw type, perforating, or any other type of circular blade effective for cutting a desired material. Some circular blades specially designed for cutting cardboard (and blades designed for cutting other materials) may be available from Baucor Tools Inc. located in Irvine, Calif. Optionally movable blade 32 may comprise any number of teeth, may include tungsten carbide teeth, and may be any suitable diameter. For example, if movable blade comprises a round blade, diameter of movable blade 32 may be about 3 to about 5 inches, about 5 inches to about 7 inches, between about 7 inches and about 9 inches, or greater than about 9 inches. In some embodiments, the kerf or width of movable blade 32 may be relatively small. Accordingly, in some examples, a width of movable blade 32 (e.g., including teeth, if any) may be between ¹⁄₃₂ inches and ¹⁄₁₆ inches or may be less than ¹⁄₁₆ inches. In an embodiment, movable blade 32 may comprise a so-called "thin kerf" blade or "micro-kerf" blade. For example, movable blade 32 may comprise a saw blade with carbide teeth that have a kerf of about ³⁄₃₂ inches or less. Such a configuration may allow for more efficient cutting and/or less generation of dust/cuttings during operation of cutting system 10.

In other embodiments (e.g., as shown in FIG. 2B), movable blade 32 may comprise a reciprocating movable blade. Certain reciprocating saw blades may be commercially available from home improvement stores and/or hardware/tool stores. Optionally movable blade 32 may comprise a reciprocating movable blade with any number of teeth, may include tungsten carbide teeth, and may be any size. For example, if movable blade comprises a reciprocating saw blade, a length of movable blade 32 may be about 1 to about 2 inches, about 2 inches to about 4 inches, between about 4 inches and about 6 inches, or greater than about 6 inches. In some embodiments, the kerf or width of movable blade 32 may be relatively small. Accordingly, in some examples, a width of movable blade 32 (e.g., including teeth, if any) may be between 1/32 inches and 1/16 inches or may be less than 1/16 inches. In an embodiment, movable blade 32 may comprise a so-called "thin kerf" reciprocating blade or "micro-kerf" reciprocating blade. For example, movable blade 32 may comprise a reciprocating blade that has a kerf of about 3/32 inches or less. Such a configuration may allow for more efficient cutting and/or less generation of dust/cuttings during operation of cutting system 10.

Figure 3B:
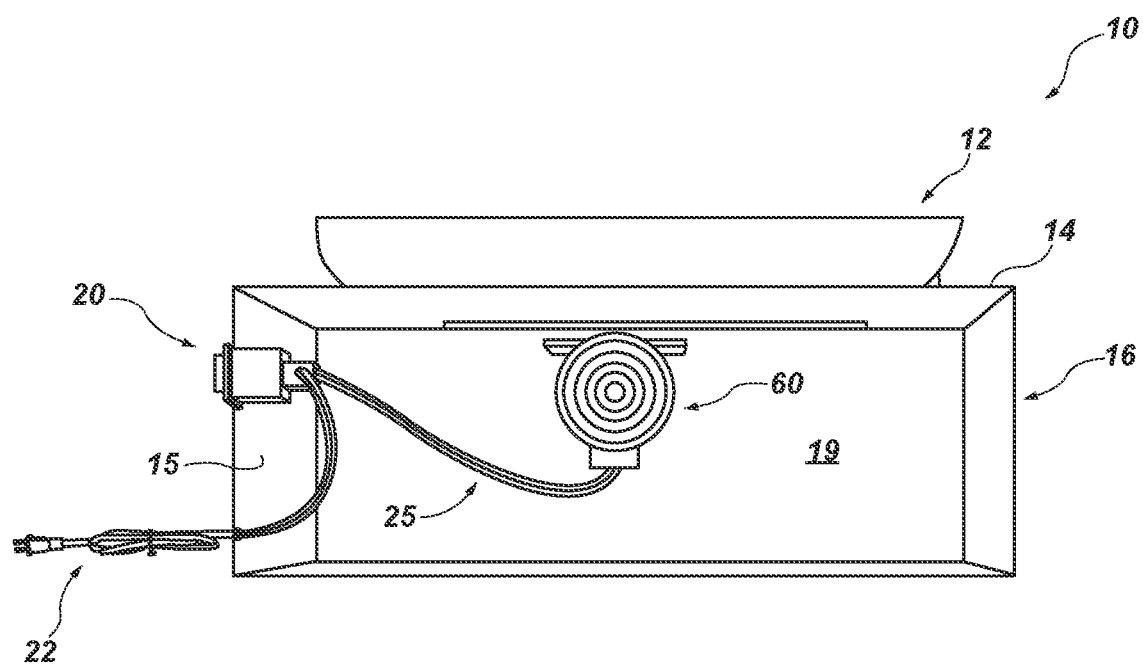
FIG. 3B shows a partial perspective view of the cutting system shown in FIG. 3A.

FIG. 3B shows a partial perspective view of one embodiment of a cutting system 10, where one side of enclosure 16 is omitted. As shown in FIG. 3B, in one embodiment, electrical cord may pass through side 15 of enclosure 16 and may be operably coupled to electrical switch 20 and motor 60, where motor 16 is attached to side 19 of enclosure 16. Wiring 25 may extend between electrical switch 20, motor 60, and/or electrical cord 22 to create a circuit in which electrical switch 20 may be operated to turn motor 60 on or off. Electrical connections between wiring 25, electrical switch 20 and motor 60 may be accomplished by any suitable configuration, such as, for example, soldering, wire nuts, crimp connectors, clamp connectors, or as otherwise known in the art.

Figure 3C:
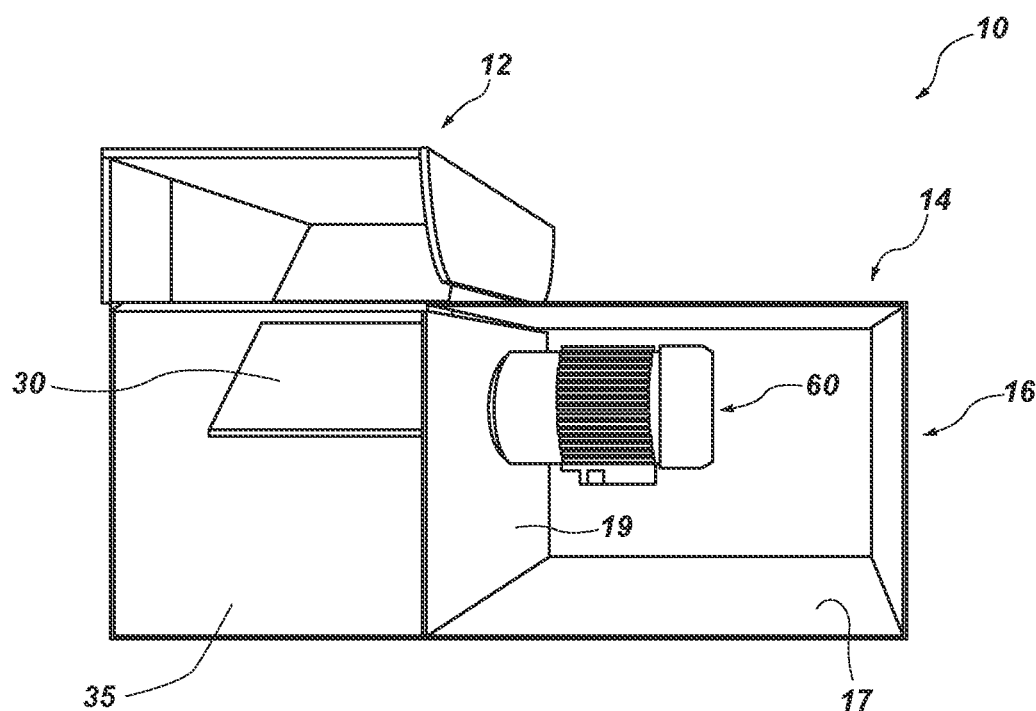
FIG. 3C shows a partial perspective view of the cutting system shown in FIG. 3B.

FIG. 3C shows a partial perspective view of an embodiment of the cutting system 10 shown in FIG. 3B, where side 15, electrical switch 20, electrical cord 22, and wiring 25 are not shown. In one embodiment, motor 60 may be affixed to side 19 of enclosure 16, table element 14, and/or bottom 17 of enclosure 16. In one embodiment, motor 60 may be affixed to side 19 by one or more fastening element (not shown). In one embodiment, a plurality of fastening elements may extend through side 19 of enclosure 16 (e.g., each fastening element positioned in an associated through hole) and may be attached to motor 60. As described herein, a fastening element may comprise a pin, a threaded fastener (e.g., a sheet metal screw, a bolt, a machine screw, etc.), a rivet, or any other suitable fastening element. Such fastening element may comprise a polymer (e.g., a plastic), a metal, or any other material. In one embodiment, a fastening element may comprise any metal (e.g., aluminum, carbon steel, stainless steel, or any metal alloy). Accordingly, in one embodiment, motor 60 may comprise a so-called "C-face" or "C-faced" (e.g., NEMA C-face) mounting configuration. However, in other embodiments, the motor 60 may be affixed to one or more of the other sides of enclosure 16, to table element 14, to both the enclosure 16 and the table element 14, or as otherwise suitable/desired, without limitation.

Motor 60 may comprise any suitable electric motor. In one embodiment, motor 60 may comprise a motor configured to operate on alternating current (e.g., 110 volts AC to 120 volts AC. In another embodiment, motor 60 may be configured to operate on direct current (e.g., 24 volts DC to 30 volts DC, 30 volts DC to 40 volts DC, 40 volts DC to 90 volts DC, or greater than 90 volts DC). Motor 60 may have a selected power output and revolutions per minute (RPM). For example, motor 60 may have a power output of less than 1 horsepower or greater than one horsepower. In one embodiment, motor 60 may have a power output between about 1/8 horsepower and about 1/2 horsepower, between about 1/16 horsepower and about 1/4 horsepower, or less than about 1/3 horsepower. Motor 60 may have a nominal RPM of more than 500 RPM, between about 500 RPM and about 1000 RPM, more than 1000 RPM, between about 1,000 RPM and about 2,000 RPM, more than about 2,000 RPM, between about 2,000 RPM and about 3,000 RPM, more than 3,000 RPM, between about 3,000 RPM to about 5,000 RPM, or between 5,000 RPM and 10,000 RPM. If motor is configured to move a reciprocating saw blade, such motor may cause the reciprocating saw blade to move at a rate of at least 500 strokes per minute (SPM). For example, a motor may cause a reciprocating saw blade to move at a rate of between about 500 SPM and about 1000 SPM, more than 1000 SPM, between about 1,000 SPM and about 2,000 SPM, more than about 2,000 SPM, between about 2,000 SPM and about 3,000 SPM, more than 3,000 SPM, between about 3,000 SPM to about 5,000 SPM.

Figure 3D:
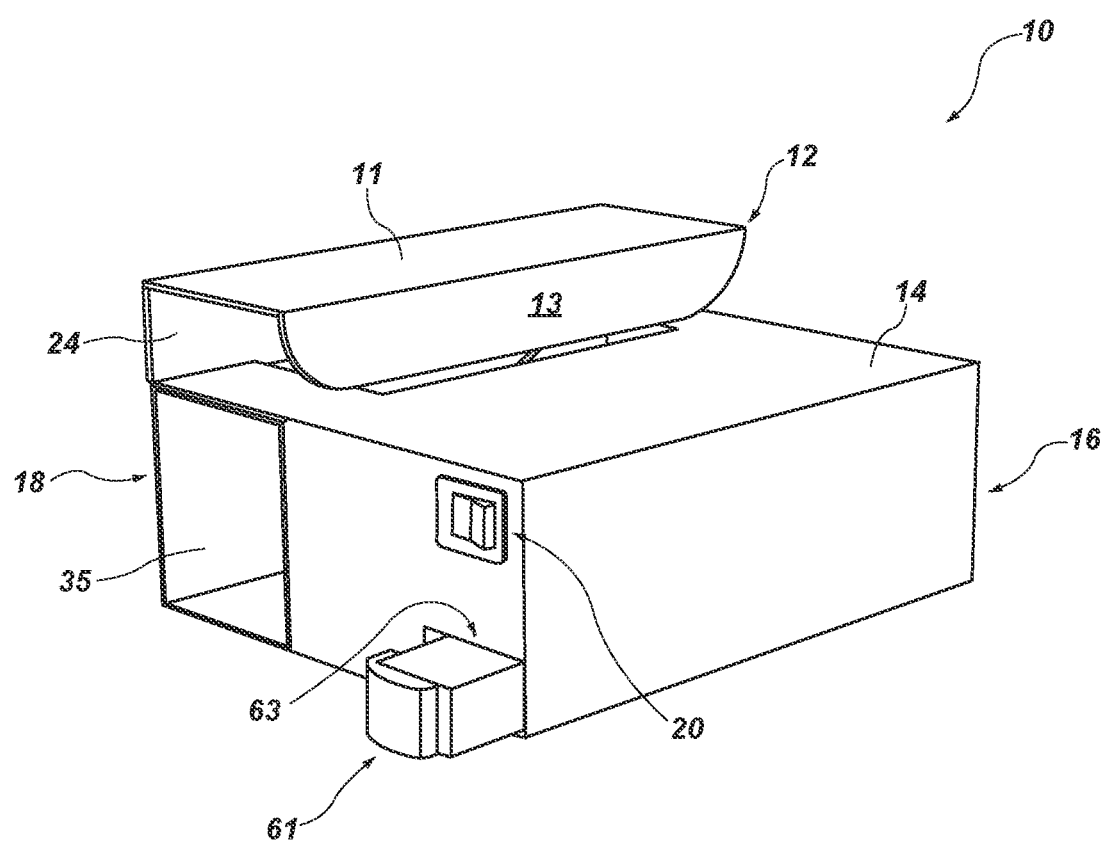
FIG. 3D shows a partial perspective view of a cutting system including a battery.

Optionally, in some embodiments, a battery may be included by cutting system 10 (e.g., in addition to electrical cord 22 or instead of electrical cord 22). FIG. 3D shows a partial perspective view of cutting system 10, including a battery 61 (instead of an electrical cord). As described previously herein, cutting system 10, as shown in FIG. 3D, includes table element 14, enclosure 16, side cover 18, and blade guard 12. Battery 61 may be positioned into battery enclosure 63, wherein battery enclosure 63 is electrically connected to electrical switch 20 (e.g., by wires or other electrical connectors). As shown in FIG. 3D, battery enclosure 63 may be positioned at least partially within enclosure 16. In some embodiments, battery enclosure 63 may be attached to enclosure 16. Accordingly, in a manner similar to cordless hand tools, battery 61 may be positioned at least partially into battery enclosure 63 such that cutting system 10 may be operated. As shown in FIG. 3D, battery 61 is not fully seated within battery enclosure 63. However, when battery 61 is fully seated into battery enclosure 63, such position enables electrical connection therebetween (and with electrical switch 20 as well as motor (not shown)). When battery 61 no longer has enough electrical energy to properly operate cutting system 10 (e.g., sufficient to operate a movable blade), such battery 61 may be removed and recharged. Alternatively, such battery 61 may be removed and replaced by another, fully charged battery (not shown). Battery 61 may be configured to deliver direct current to a motor (not shown). For example, battery 61 may be capable to supply 24 volts DC to 30 volts DC, 30 volts DC to 40 volts DC, 40 volts DC to 90 volts DC, or greater than 90 volts DC to a motor included by cutting system 10. Such a configuration may provide convenient operation of cutting system 10.

In some embodiments, table element 14 may be attached to enclosure 16. For example, table element 14 and enclosure 16 may be attached to one another via at least one fastening element (not shown). For example, one fastening element, two fastening elements, three fastening elements, or more than three fastening elements may be positioned at or near adjacent portions of enclosure 16 and table element 14. In one example, holes may be formed through table element 14 and enclosure 16, where a fastening element is positioned in each hole. A fastening element may comprise a pin, a threaded fastener (e.g., a sheet metal screw, a bolt, a machine screw, etc.), a rivet, or any other suitable fastener. Such fastening element may comprise a polymer (e.g., a plastic), a metal, or any other material. In one embodiment, a fastening element may comprise aluminum, carbon steel, stainless steel, any metal, or metal alloy. In yet further embodiments, enclosure 16 and/table element 14 may include complementary features (e.g., tabs and slots) which fit into/onto one another and facilitate attachment of enclosure 16 and table element 14.

Figure 4:
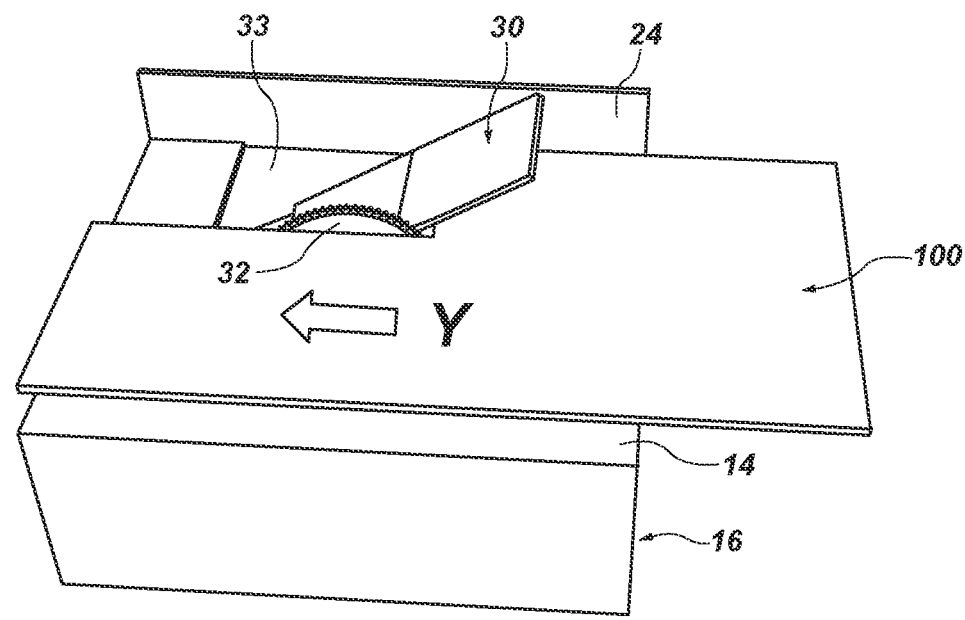
FIG. 4 shows a partial perspective view of a cutting system during use.
Figure 5:
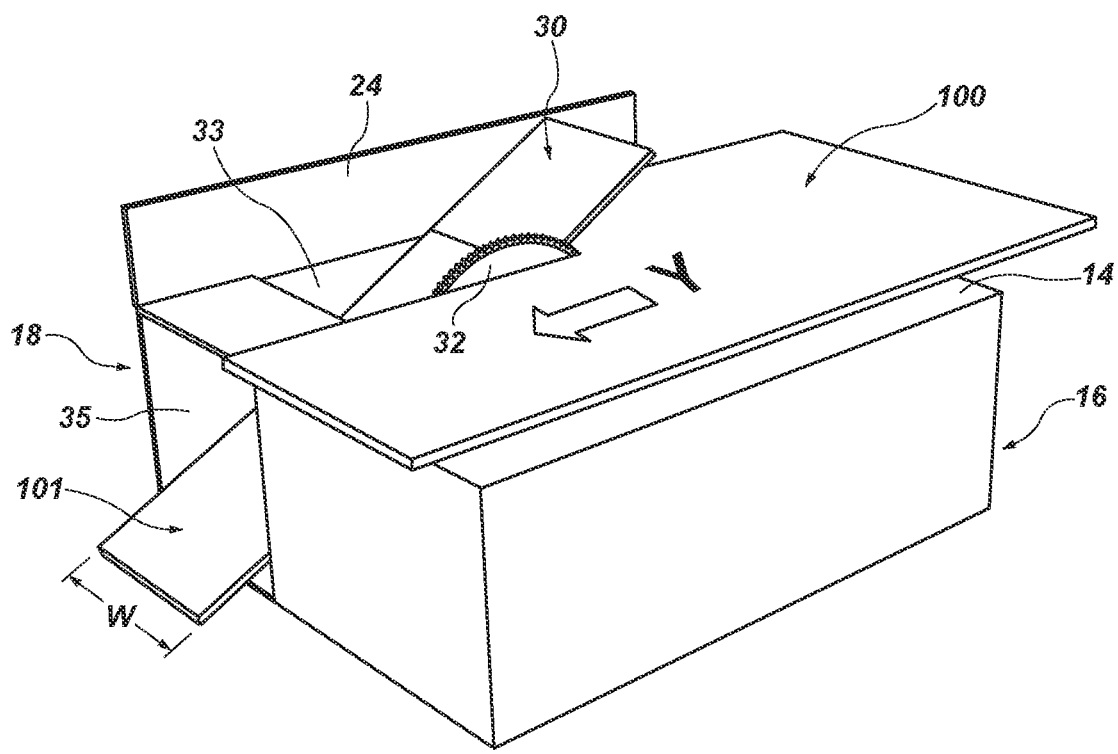
FIG. 5 shows a partial perspective view of the cutting system shown in FIG. 4 during use.

FIGS. 4 and 5 show respective partial views of an embodiment of cutting system 10 during operation. As shown in FIGS. 4 and 5, as material 100 is moved over table element 14 in a direction Y, movable blade 32 (shown as a rotatable blade) cuts the material 100. The strip portion 101 (FIG. 5) of material 100 cut by movable blade 32 may be diverted and/or guided by diverting feature 30 as it moves toward exit opening 35. As shown in FIG. 5, width "W" of strip portion 101 may be generally the distance between fence element 24 and movable blade 32. Material 100 may be moved over table element 14 until movable blade 32 completely separates strip portion 101 from material 100. The process depicted and explained herein with respect to creating a strip portion of a material to be cut may be repeated as desired by a user, subject to safety considerations. In one particular example, material may comprise cardboard, such as a cardboard box, which may be repeatedly cut into strips. Further, such strips may be more compact than the space occupied by the original box shape of the cardboard. In addition, strips of cardboard may be relatively easy to store and empty from residential recycling containers or trash containers.

Figure 6A:
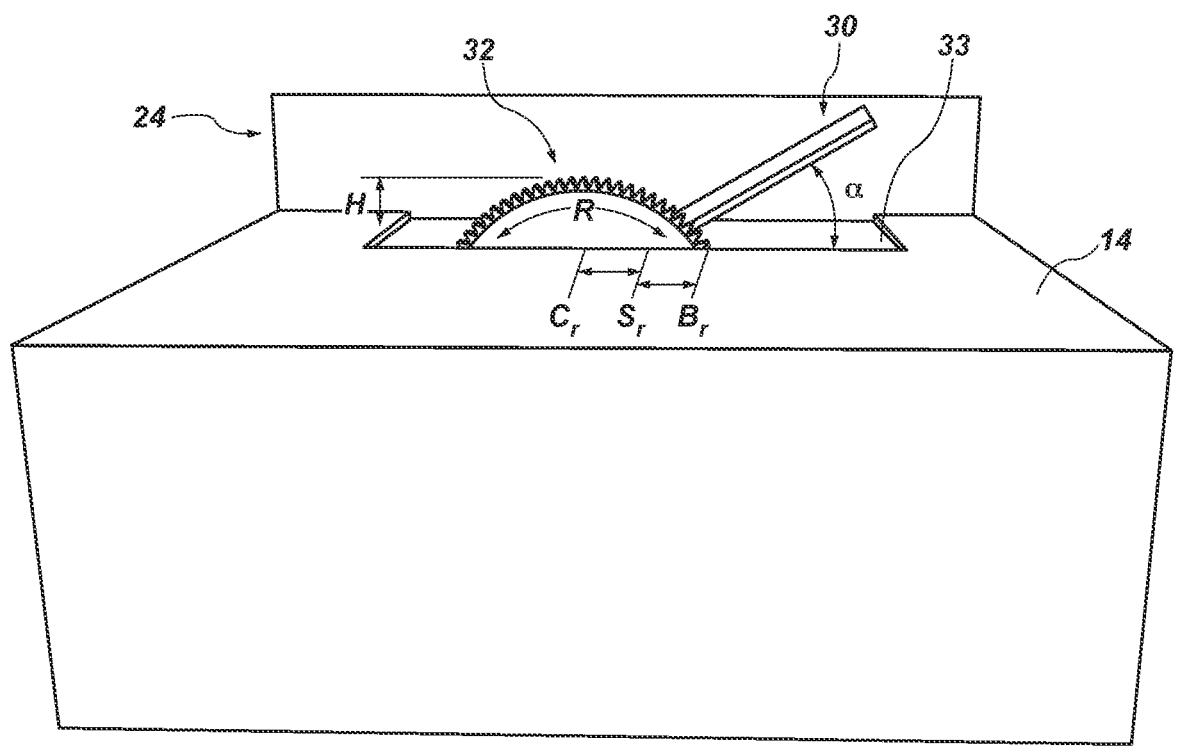
FIG. 6A shows an enlarged partial perspective view of one embodiment of a cutting system.

FIG. 6A shows a partial perspective view of an embodiment of cutting system 10, depicting certain spatial relationships between movable blade 32, diverting feature 30, and table element 14. For example, as shown in FIG. 6A, movable blade 32, switch (not shown), and motor (not shown) may be configured to rotate in a selected direction R (clockwise or counterclockwise). In some embodiments, movable blade 32, switch (not shown), and motor (not shown) may be configured to cause blade rotation in one of two directions (clockwise and counterclockwise). Further, movable blade 32 may be positioned such that the apex of movable blade 32 extends to a height H above the upper surface of table element 14. Height H may be about equal to thickness t (FIG. 1) or may be greater than thickness t. Reference line $C_r$ represents the position of the axis of rotation of movable blade 32, as viewed from a top view (i.e., perpendicular to the top surface of table element 14). Reference line $S_r$ represents the position that the upper surface of diverting feature 30 crosses the upper surface of table element 14, when viewed from a side view (i.e., perpendicular to the fence element surface visible in FIG. 6A). Reference line $B_r$ represents the position that the blade diameter crosses the upper surface of table element 14 and at which the blade first encounters a material to be cut (as shown in FIGS. 4 and 5), when viewed from a side view (i.e., perpendicular to the fence element surface visible in FIG. 6A). As shown in FIG. 6A, the diverting feature 30 may be sized, positioned, and/or configured to contact a material being cut by blade within diverter proximity x (diverter proximity x is measured in the Y direction, as shown in FIGS. 4 and 5) of being cut by movable blade 32. In some embodiments, diverter proximity "x" may smaller than the radius of the movable blade 32. For example, diverter proximity x may be less than about 4 inches, less than about 3 inches, less than about 2 inches, less than about 1 inch, between 0.5 inches and 1 inch, or between 0 inches and about 1 inch. Selecting the diverter proximity according to the material to be cut (e.g., its flexibility), may cause diversion of a portion of a material cut by blade 32 to be suitably deflected toward exit opening 35 during operation of cutting system 10. As shown in FIG. 6A, the diverting feature 30 may be sized, positioned, and/or configured to contact a material being cut by blade at distance d before such material reaches $S_r$ (distance d is measured in the Y direction, as shown in FIGS. 4 and 5). In some embodiments, distance d may greater than 0 inches. For example, diverter proximity x may be greater than about 0.25 inches, greater than about 0.5 inches, greater than about 1 inch, greater than about 2 inches, between 1.5 inches and 3 inches, or between 2 inches and 4 inches. More generally, diverting feature 30 may be sized, positioned, and/or configured to contact a material to be cut at a location effective to divert such material (e.g., downward in relation to upper surface of table element 14).

Further, as shown in FIG. 6A, angle α is the angle formed between the lower surface of diverting feature 30 and the upper surface of table element 14. In some embodiments, angle α may be between about 10 degrees and about 80 degrees. For example, angle α may be between about 20 degrees and about 60 degrees, between about 15 degrees and about 45 degrees, between about 20 degrees to about 40 degrees, or less than about 60 degrees. More generally, a magnitude of angle α may be selected such that it is effective to divert a material being cut (e.g., as described with reference to FIGS. 4 and 5). In some embodiments, angle α may be adjustable, as described in further detail herein.

Figure 6B:
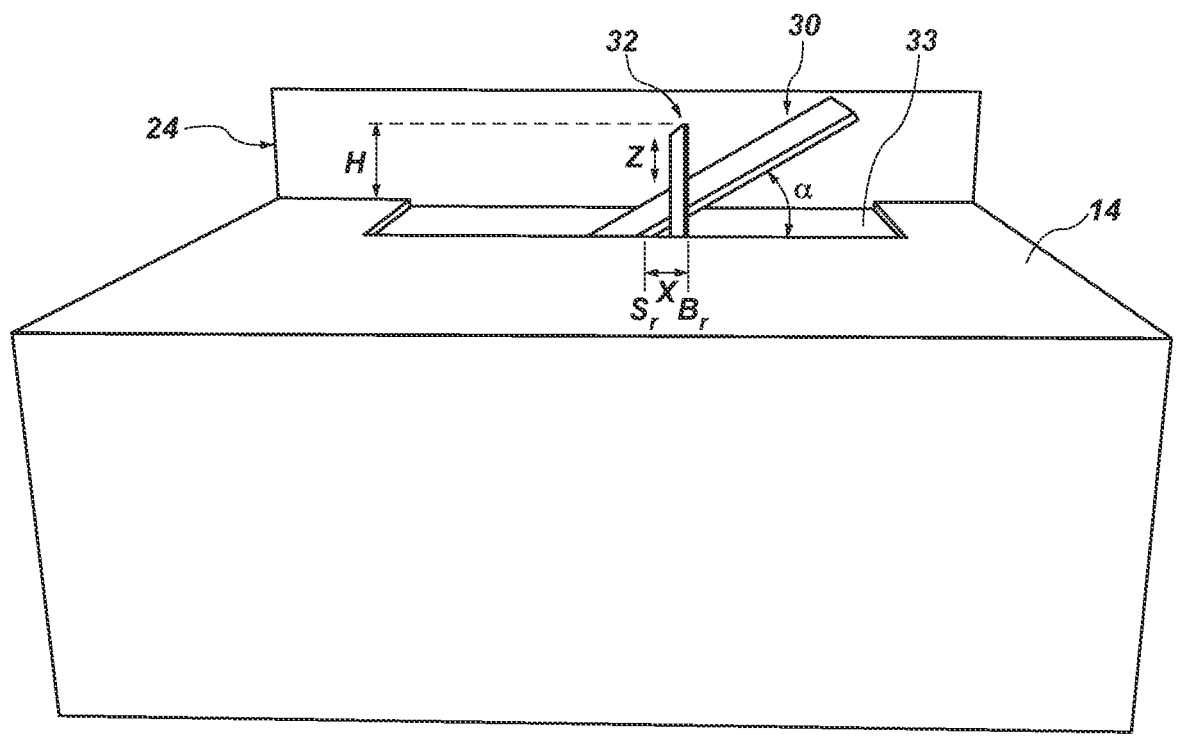
FIG. 6B shows an enlarged partial perspective view of one embodiment of a cutting system including a reciprocating blade.

FIG. 6B shows a partial perspective view of an embodiment of cutting system 10, depicting certain spatial relationships between movable blade 32, which is shown as a reciprocating blade, diverting feature 30, and table element 14. Further, movable blade 32 may be positioned such that the apex of movable blade 32 (during reciprocation) extends to a height H above the upper surface of table element 14. Height H may be about equal to thickness t (FIG. 1) or may be greater than thickness t. Reference line $S_r$ represents the position that the upper surface of diverting feature 30 crosses the upper surface of table element 14, when viewed from a side view (i.e., perpendicular to the fence element 24 surface visible in FIG. 6B). Reference line $B_r$ represents the position that the blade 32 crosses the upper surface of table element 14 and at which the blade first encounters a material to be cut (as referenced in FIGS. 4 and 5), when viewed from a side view (i.e., perpendicular to the fence element surface visible in FIG. 6B). As shown in FIG. 6B, the diverting feature 30 may be sized, positioned, and/or configured to contact a material being cut by blade within diverter proximity x (diverter proximity x is measured in the Y direction, as shown in FIGS. 4 and 5) of being cut by movable blade 32. In some embodiments, diverter proximity x may smaller than the radius of the movable blade 32. For example, diverter proximity x may be less than about 4 inches, less than about 3 inches, less than about 2 inches, less than about 1 inch, between 0.5 inches and 1 inch, or between 0 inches and about 1 inch. Selecting diverter proximity x may cause diversion of a portion of a material cut by blade 32 to be suitably deflected toward exit opening 35 during operation of cutting system 10.

Figure 7A:
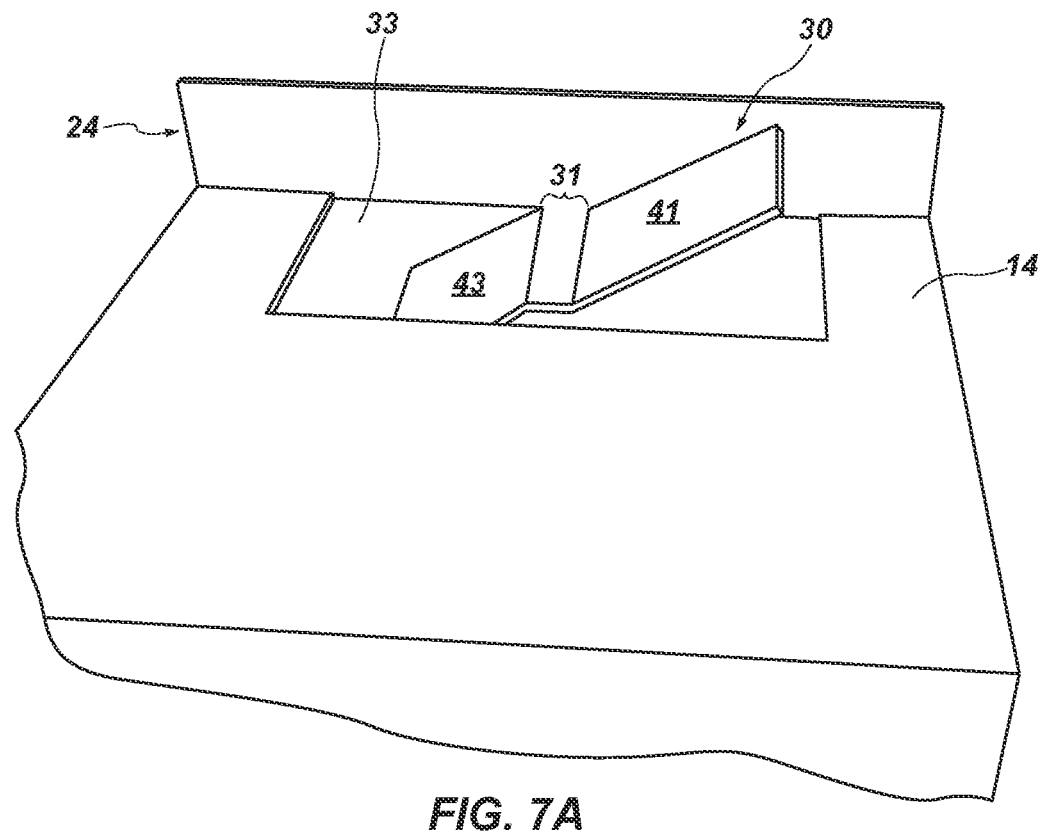
FIG. 7A shows an enlarged partial perspective view of one embodiment of a diverting feature.
Figure 7B:
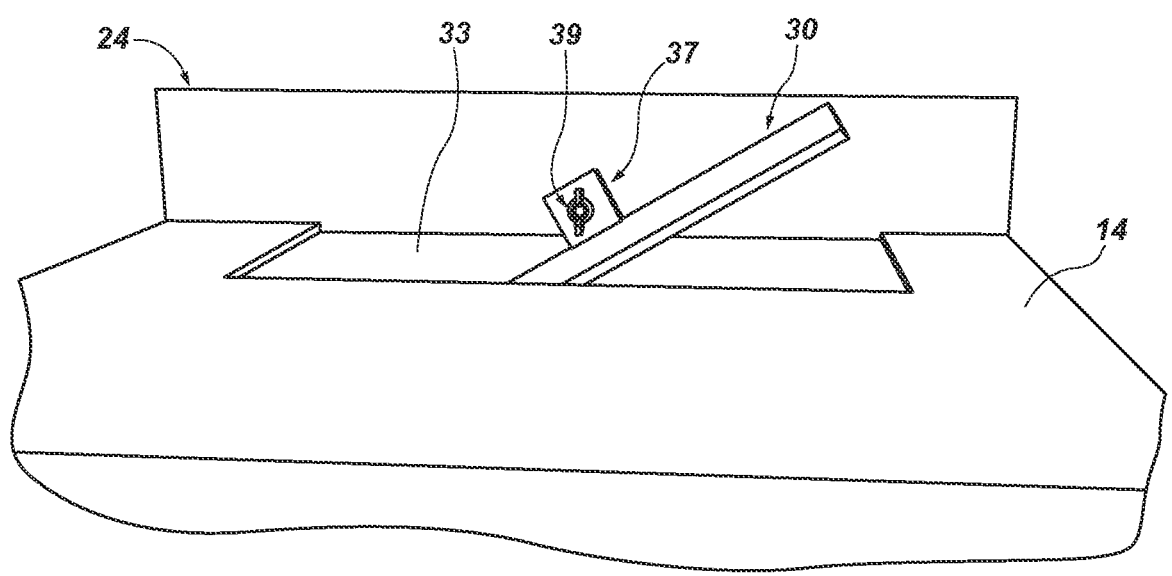
FIG. 7B shows an enlarged partial perspective view of another embodiment of a diverting feature.

FIG. 7A shows a partial perspective view of a cutting system depicting an embodiment of diverting feature 30. As shown in FIG. 7A, diverting feature 30 may comprise slant portions 41 and 43 as well as connecting tab 31. In one embodiment, table element 14 may comprise a sheet of material (e.g., a metal or metal alloy, such as stainless steel, carbon steel, aluminum, or any suitable metal alloy; a polymer, such as plastic, or any other suitable material, without limitation) that may be cut and bent to form fence element 24 and diverting feature 30. For example, opening 33 may be formed by cutting around diverting feature 30 from a flat sheet of material (e.g., a metal or metal alloy, such as stainless steel, carbon steel, aluminum, or any suitable metal alloy) and then bending slant portion 41 upward and bending slant portion 43 downward. In such an embodiment, slant portion 41 may be oriented at a selected angle relative to the upper surface of table element 14 and slant portion 43 may be oriented at another selected angle (e.g., substantially equal to the selected angle of slant 41 relative to the upper surface of table element 14 or at a different angle of slant 41 relative to the upper surface of table element 14). It may be also noted that top guard 11 and front guard 13 (shown in FIG. 1) may also be formed from the same sheet of material as forms table element 14. Such a configuration may provide a relatively efficient use of materials and/or process for manufacture. FIG. 7B shows a partial perspective view of a cutting system depicting another embodiment of diverting feature 30. As shown in FIG. 7B, diverting feature 30 may comprise a generally planar rectangular shape and may also include mounting pad 37. Mounting pad 37 may have a through hole aligned with a through hole formed in fence element 24. A bolt (not shown) may be positioned through the holes in mounting pad 37 and fence element 24 and wingnut 39 may be threaded thereon to compress mounting pad 39 against the surface of fence element 24. Such a configuration may allow diverting feature 30 to be oriented (e.g., angle α, as shown in FIG. 6) as desired by a user of a cutting system. Further, such a configuration may allow for diverting features having different designs to be used on a single cutting system. In other embodiments, a plurality of holes along fence element 24 may allow for diverting feature 30 to be positioned at different locations (e.g., each location at a different diverter proximity x). In yet further embodiments, instead of a plurality of holes, a slot may be formed in fence element 24, which would allow for loosening of a bolt and wingnut such that diverter proximity x (FIGS. 6A and 6B) may be adjusted. The embodiments of diverting feature 30 shown in FIGS. 7A and 7B are not intended to be limiting. Rather, a diverting feature contemplated herein may have any geometry (e.g., arcuate, planar, or combinations thereof), may be releasably attached (and optionally, its position may be adjustable) to the table element, fence element 24, or may be otherwise configured to guide a strip portion as described herein, without limitation.

Figure 8A:
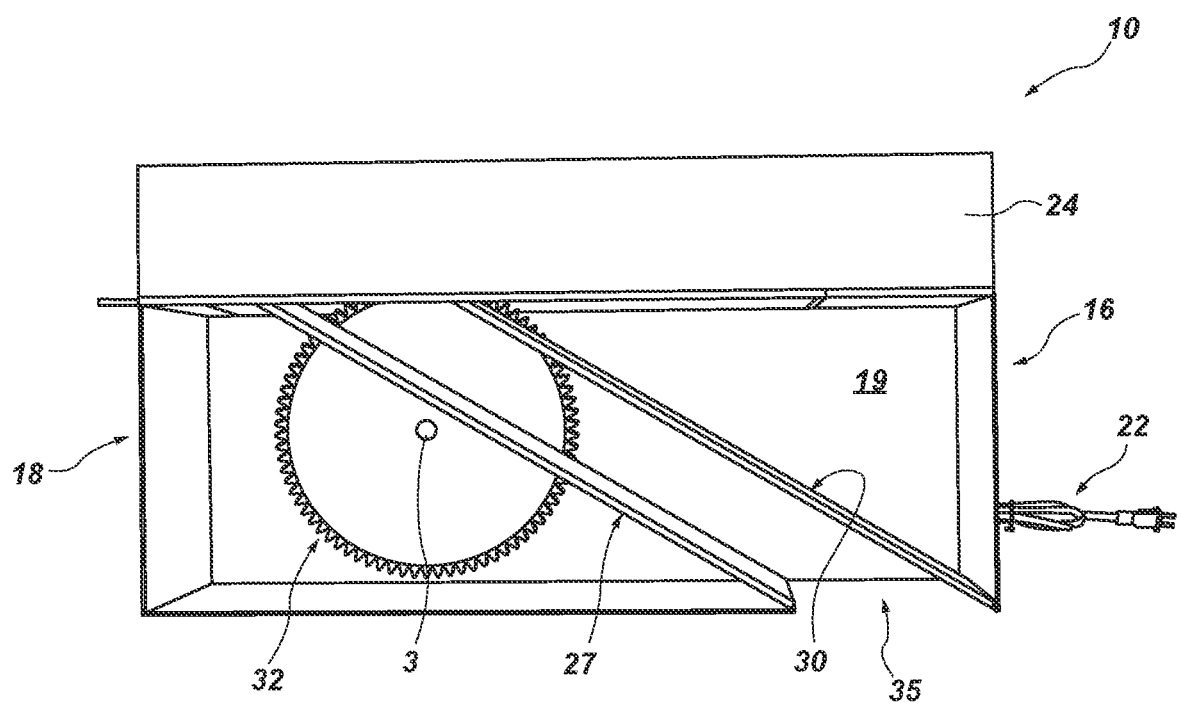
FIG. 8A shows a partial perspective view of a cutting system including an embodiment of a diverting feature and a guide feature.

Further, a multitude of diverting feature and exit opening configurations and embodiments are contemplated by the instant disclosure. For example, in one embodiment, FIG. 8A shows a partial perspective view of an embodiment of cutting system 10, where one side of side cover is not shown. As shown in FIG. 8A, in addition to a diverting feature 30, a lower guide feature 27 may be included to facilitate material moving toward exit opening 35. Further, movable blade 32 and/or motor (not shown) may be positioned at a selected position with respect to enclosure 16 and/or side 19 of enclosure 16, without limitation. For example, movable blade 32 and/or motor (not shown) may be positioned vertically and/or laterally centrally with respect to side 19 of enclosure 16. In other embodiments, for example, as shown in FIG. 8A, movable blade 32 may be positioned laterally offset with respect to side 19 of enclosure 16 (e.g., farther away from the side of enclosure 16 including the electrical switch 20). Also, as shown in FIG. 8A, the space defined between diverting feature 30 and lower guide 27 may not encompass the center blade mounting mechanism 3 (e.g., a blade motor arbor), which may allow for relatively unimpeded movement of material toward exit opening 35 during use of cutting system 10.

Figure 8B:
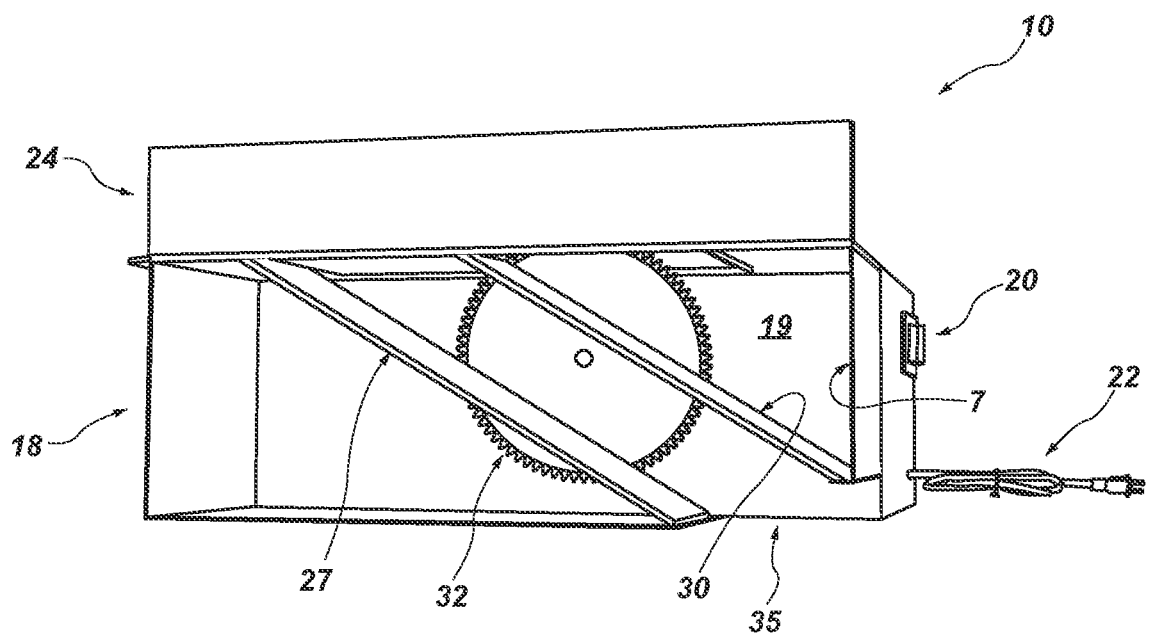
FIG. 8B shows a partial perspective view of a cutting system including another embodiment of a diverting feature and a guide feature.

FIG. 8B shows a partial perspective view of an embodiment of cutting system 10, where one side of side cover is not shown. As shown in FIG. 8B, diverting feature 30 and a lower guide feature 27 may be included to facilitate material moving toward exit opening 35. As shown in FIG. 8B, side cover 18 may include a side 7, which may be positioned to reduce exposure of the movable blade 32 near exit opening 32. The size, position, and configuration of diverting feature 30, guide, and/or movable blade 32 may be selected to reduce the amount of resistance to cutting and diverting a material toward exit opening 35 during use of a cutting system 10. Optionally, the direction of rotation of the blade, thickness of the blade (e.g., kerf), and/or the number of teeth on the blade (if applicable) may be selected to reduce the amount of resistance to cutting and diverting a material toward exit opening 35 during use of a cutting system 10.

Figure 8C:
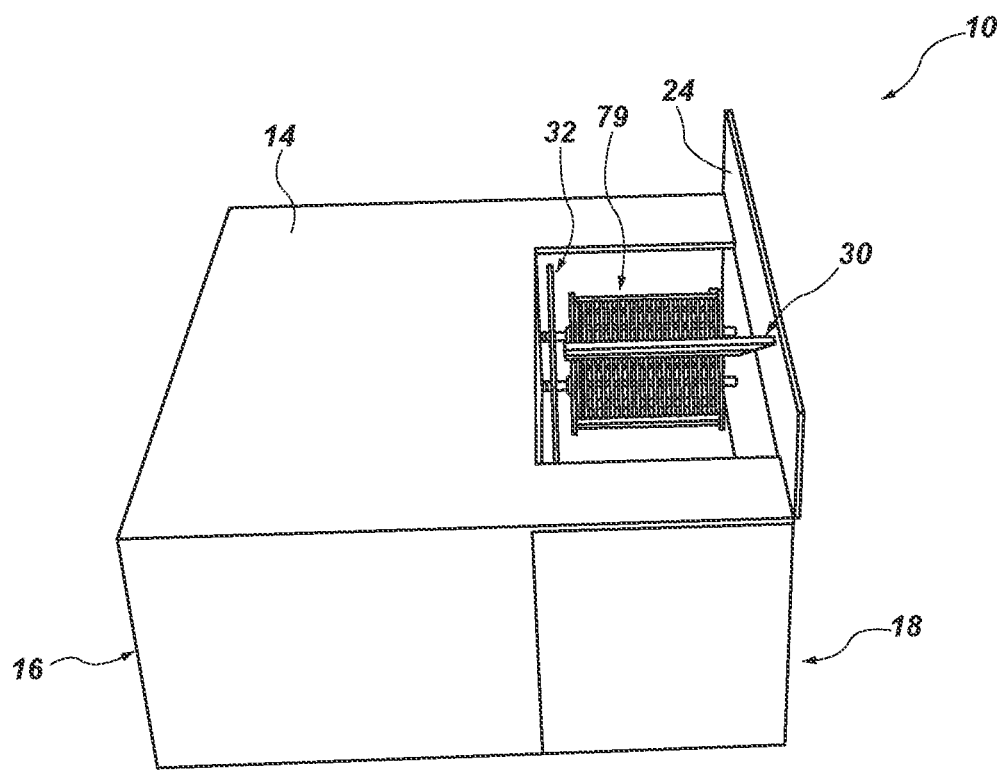
FIG. 8C shows a partial perspective view of an embodiment of a cutting system including a shredding device.

In a further aspect of the present invention, a shredding device may comprise at least a portion of a cutting system. FIG. 8C shows a partial perspective view of cutting system 10 including shredding device 79. As shown in FIG. 8C, in one embodiment, shredding device 79 may comprise a so-called dual shaft shredding device, with a plurality of shearing blades arranged on both shafts. Shredding device 79 may comprise any suitable shredding device as known in the art. For example, shredding device 79 may comprise a single shaft shredding device, a dual shaft shredding device, or any other shredding device. Shredding device 79 may be operably coupled and rotated by a motor (and gears) separate from the motor (e.g., any motor described above with respect to motor 60) which is operably coupled to movable blade 32, if movable blade 32 is included in such embodiment. Alternatively, shredding device 79 may be operably coupled and rotated by the motor which is operably coupled to movable blade 32, optionally in combination with gears and/or a gear reducer (to slow the rotation speed of the shaft(s) of shredding device 79 and increase the available torque. Also as shown in FIG. 8C, shredding device may be sized, positioned, and configured to encounter a strip of material after it is cut and/or diverted (as described above). In other embodiments, movable blade 32 may be omitted and shredding device 79 may be configured to pull the material to be cut against a fixed blade (not shown) in order to form the strip of material. In general, the present invention contemplates that a cutting system may include at least one of a rotating blade and a shredding device, without limitation.

Figure 9:
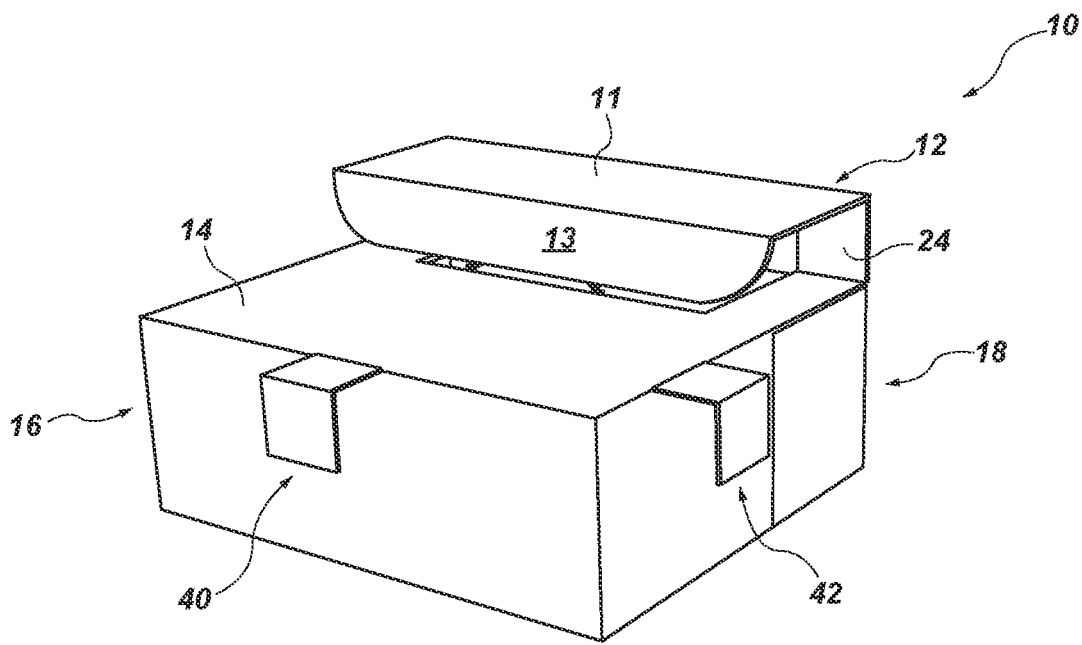
FIG. 9 shows a perspective view of one embodiment of a cutting system including coupling features.

FIG. 9 shows cutting system 10 including coupling features 40 and 42. Coupling features 40 and 42 may be sized and configured to be positioned along the edge of a residential trash/recycling container (e.g., a municipal trash/recycling container) and may form a right angle, u-shaped feature, or a "hook" structure to couple with each such edge, respectively. Coupling features 40 and 42 may be attached to enclosure 16 and/or table element 14. In one embodiment, coupling features 40 and 42 may be attached to enclosure 16 and/or table element 14 by way of one or more fastener. In another embodiment, coupling features 40 and 42 may be attached to enclosure 16 and/or table element 14 by welding or may be integrally formed with enclosure and/or table element 14 (e.g., formed from a common sheet of metal or metal alloy, which may be bent or otherwise formed into place as shown in FIG. 9).

Figure 10:
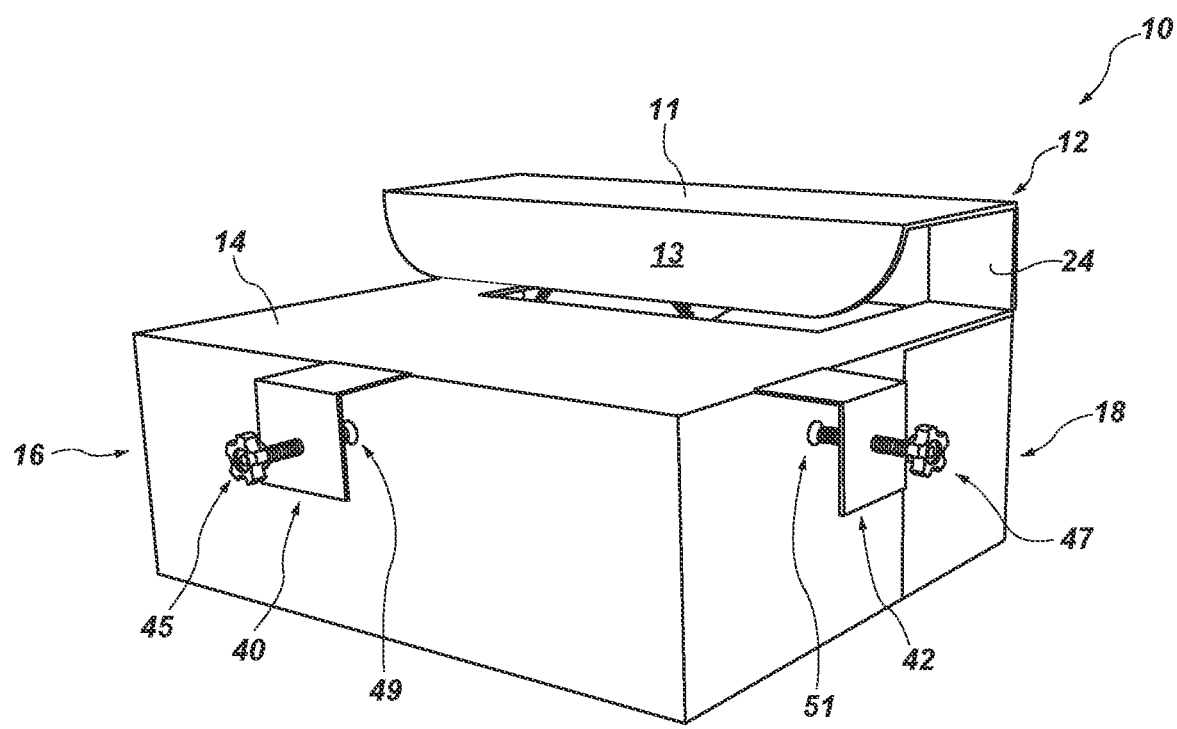
FIG. 10 shows a perspective view of one embodiment of a cutting system including coupling features and movable clamps.

FIG. 10 shows a cutting system 10 as described with respect to FIG. 9, but further comprising movable clamps 45 and 47, which are operably coupled to coupling features 40 and 42, respectively. Movable clamp 45 includes foot 49, which may be configured to align with a surface against which it is forced. In one embodiment, foot 49 may comprise a so-called swivel foot, which are commonly used in clamping devices. In one embodiment, clamp 45 may be threaded and coupling feature 40 may be complementarily threaded, such that foot 49 may be movable toward enclosure 16 or away from enclosure 16 by rotating clamp 45 in different directions (e.g., clockwise or counterclockwise). Movable clamp 47 includes foot 51, which may be configured to align with a surface against which it is forced. In one embodiment, foot 51 may comprise a so-called swivel foot, which are commonly used in clamping devices. In one embodiment, clamp 47 may be threaded and coupling feature 42 may be complementarily threaded, such that foot 51 may be movable toward enclosure 16 or away from enclosure 16 by rotating clamp 47 in different directions (e.g., clockwise or counterclockwise). Although one embodiment of clamps 45 and 47 have been described herein as threaded clamps, any suitable clamping device may be used to effectively position cutting system 10 during use, without limitation. For example, clamps 45 or 47 may comprise a toggle clamps, a spring clamp, a bar clamp, a trigger clamp, or any suitable clamp, without limitation.

Figure 11:
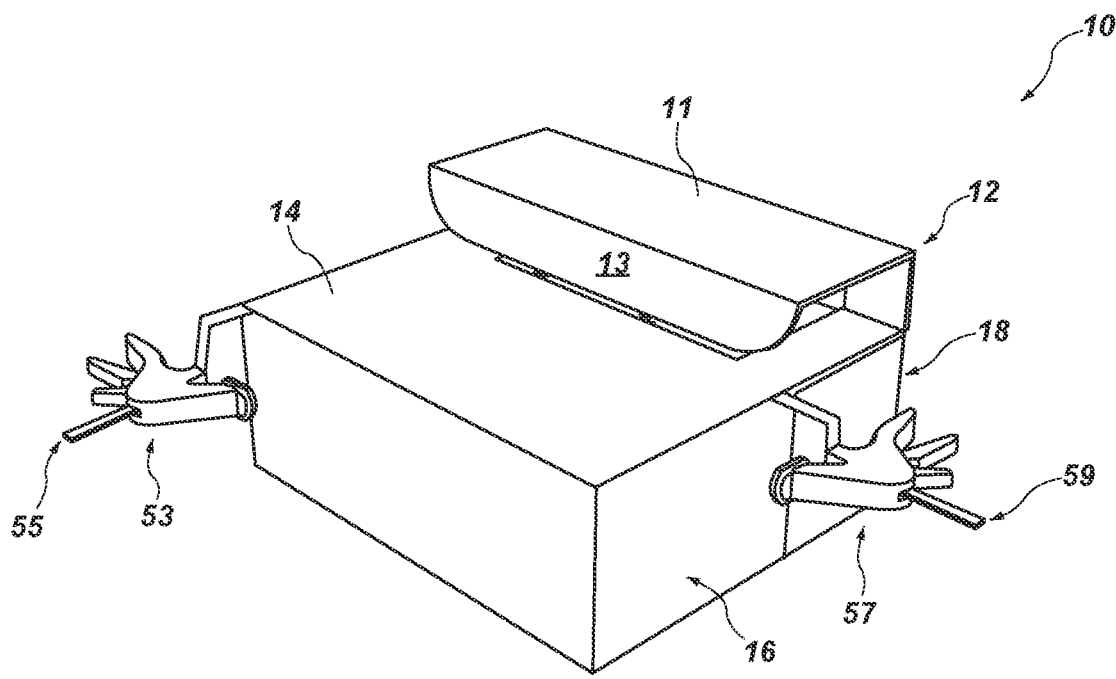
FIG. 11 shows a perspective view of another embodiment of a cutting system including coupling features and movable clamps.

FIG. 11 shows cutting system 10 including coupling bars 55 and 59. Coupling bars 55 and 59 may be sized and configured to be positioned over an edge of a residential trash/recycling container. For example, coupling bars 55 and 59 may be bent to form a right angle, u-shaped feature, or a "hook" structure. Coupling features 55 and 59 may be attached to enclosure 16 and/or table element 14. In one embodiment, coupling features 55 and 59 may be attached to enclosure 16 and/or table element 14 by way of one or more fastener(s). As shown in FIG. 11, coupling bars 55 and 59 may be bent to form a geometry that stabilizes cutting system 10 during use. For example, coupling bars 55 and 59 may be sized and configured to be stabilize cutting system 10 when positioned over the edge of a residential trash/recycling container. Movable clamp 53 may be movable toward enclosure 16 or away from enclosure 16 by squeezing a trigger to move toward enclosure 16 or releasing the movable clamp 53 and moving the clamp 53 away from the enclosure 16. Conventional so-called trigger clamps conventionally include a straight bar and a trigger clamp structure. Such conventional trigger clamps may be used, for example, in wood working and certain conventional trigger clamps may be purchased at home improvement stores.

Figure 12:
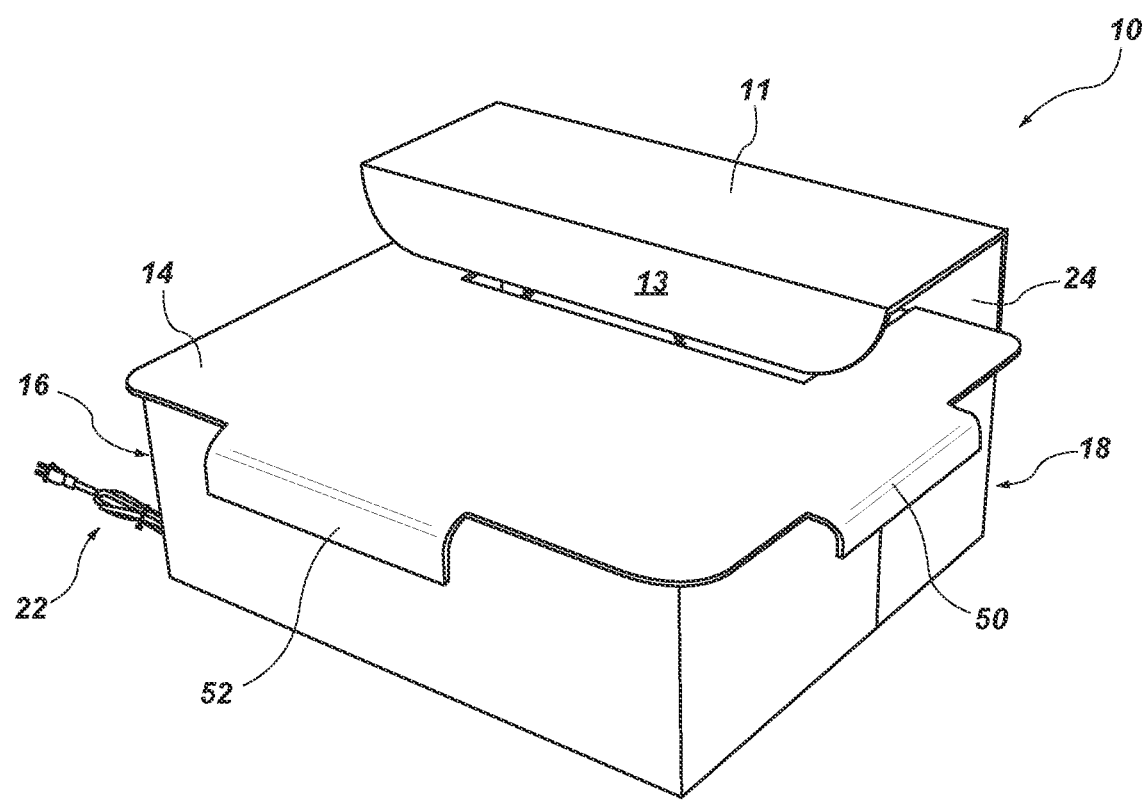
FIG. 12 shows a perspective view of yet another embodiment of a cutting system including coupling features.

FIG. 12 shows a perspective view of one embodiment of cutting system 10 generally as described in FIG. 9 but including coupling features 50 and 52 (instead of coupling features 40 and 42, as shown in FIG. 9). Further, table element 14 is oversized with respect to the enclosure (at least one edge of table element 14 overhangs enclosure 16) and has rounded corners. Coupling features 50 and 52 may be formed from a sheet of material which also forms table element 14 or may be formed separately and attached to enclosure 16 and/or table element 14. Coupling features 50 and 52 may be sized and configured to be positioned along the edge of a residential trash/recycling container and may form a right angle, u-shaped feature, or a "hook" structure to couple with each such edge, respectively. Optionally, movable clamps (e.g., movable clamps 45/47, as described with reference to FIG. 10) may be sized, configured, and attached to coupling features 50 and 52 to secure cutting system to a container during use.

Figure 13:
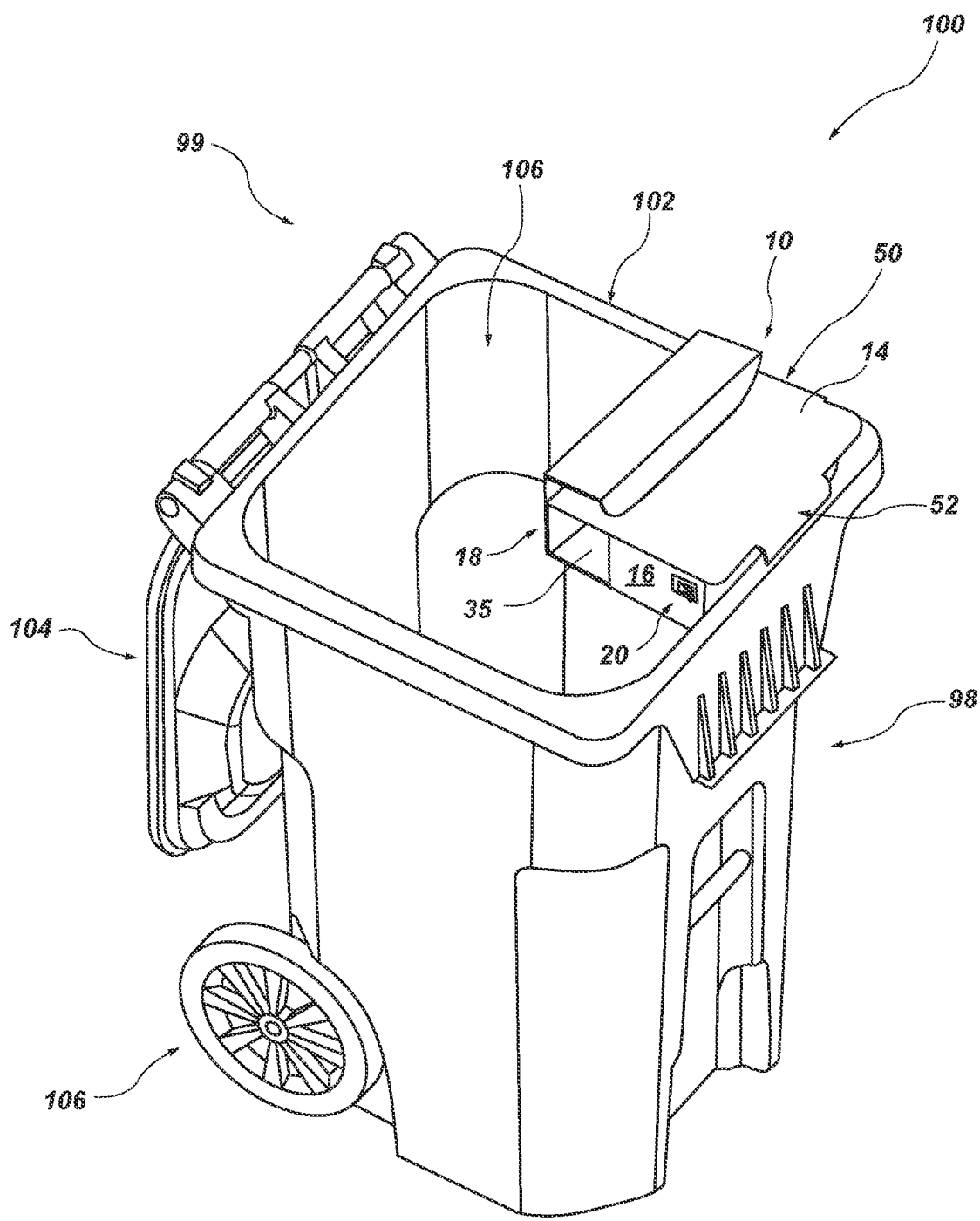
FIG. 13 shows a perspective view of the cutting system shown in FIG. 12 coupled to a container.

As mentioned herein, a cutting system according to the present invention may be coupled to a trash/recycling container and operated to create strip portions from a larger piece of material (e.g., cardboard). FIG. 13 shows a perspective view of a cutting system 10 coupled to a container 99. As shown in FIG. 13, assembly 100 includes cutting system 10 and container 99. Cutting system 10 shown in FIG. 13 may include one or more element or feature, (e.g., clamp, diverting feature, coupling feature, or any other configuration or structure) described herein, in any combination, without limitation. Container 99 comprises container body 98, wheels 106 (only one shown), and lid 104, which is rotatably connected to body 98 to allow opening and closing of opening 106. Cutting system 100 is coupled to container 99 by way of coupling features 50 and 52, which may be coupled on or about portions of the upper periphery 102 of container body 98, where upper periphery 102 defines opening 106. Coupling features 50/52 may be sized and configured to stabilize cutting system 10, during operation. The present invention contemplates other embodiments to stabilize cutting system 10. For example, clamps (e.g., spring clamps, bar clamps, screw clamps, trigger clamps, or any other suitable clamp) may be used instead of coupling features 50/52, in combination with coupling features 50/52, or in combination with other coupling mechanisms, without limitation.

Figure 14A:
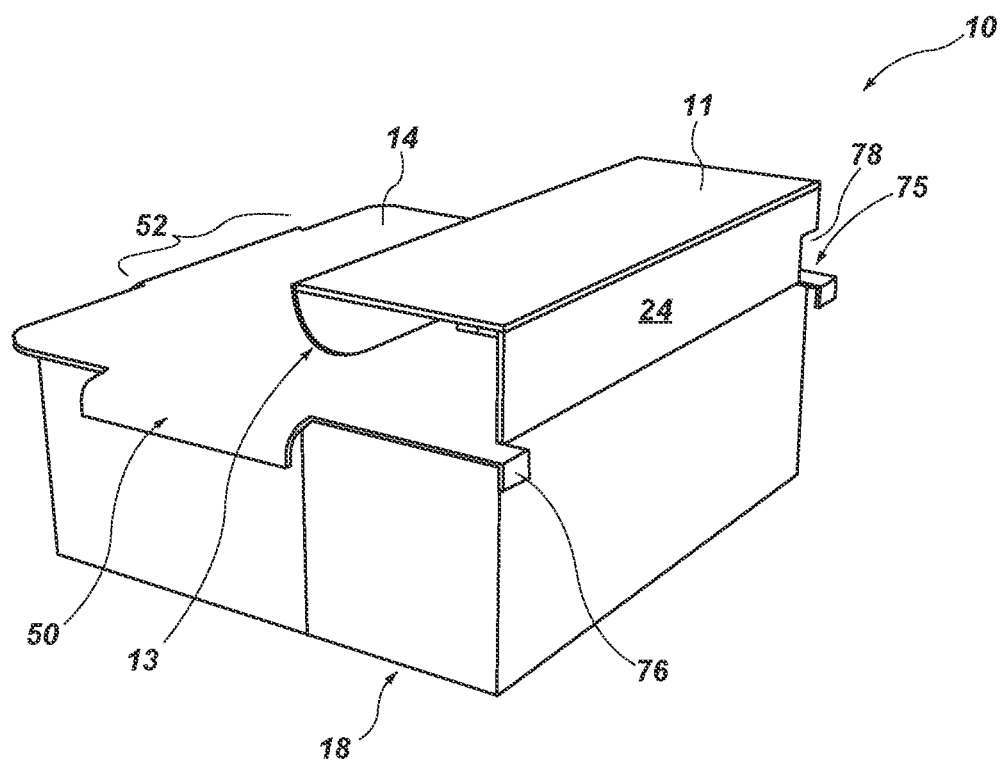
FIG. 14A shows a perspective view of one embodiment of a cutting system including support features.
Figure 14B:
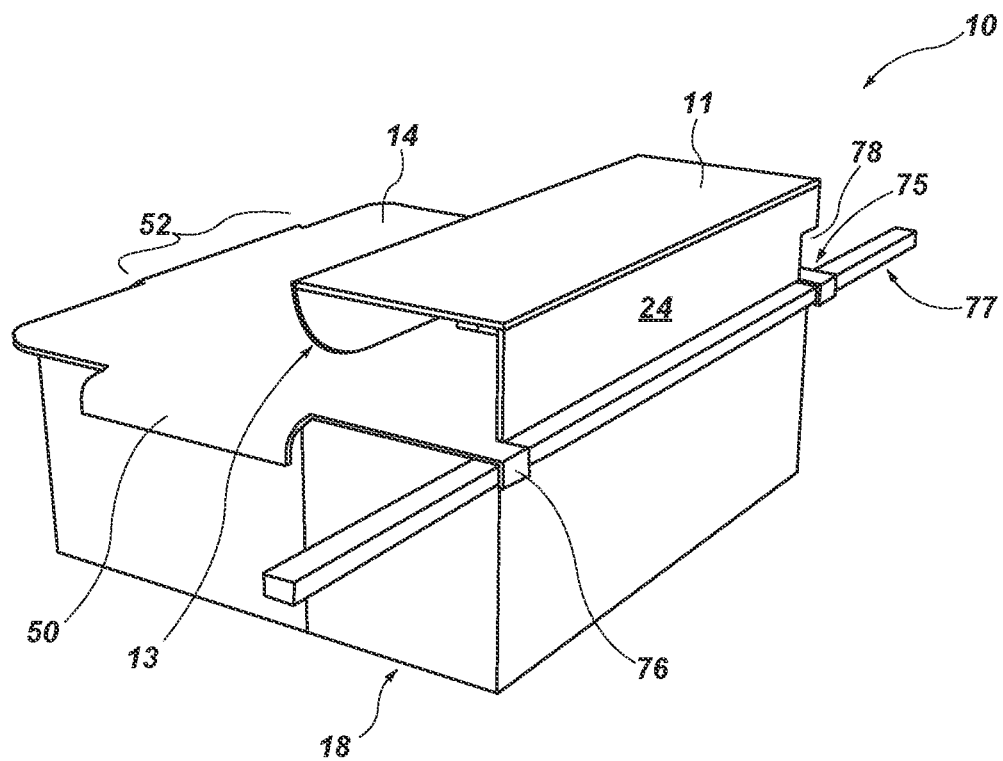
FIG. 14B shows a perspective view of the cutting system shown in FIG. 14A assembled with a support bar.

FIG. 14A shows a perspective view of one embodiment of cutting system 10 generally as described in FIG. 12 but including support features 75 and 76. Support features 75 and 76 may be formed from a sheet of material which also forms table element 14 or may be formed separately and attached to enclosure 16, side cover 18, and/or table element 14. As shown in FIG. 14A, cutout area 78 may be bent to form support feature 75 (instead of remaining a portion of fence element 24). Such support features 75 and 76 may be sized and configured to support cutting system 10 during use, optionally in combination with one or more coupling features as discussed herein. FIG. 14B shows a perspective view of the cutting system 10 shown in FIG. 14A, including support bar 77. In one embodiment, support bar may comprise a square (in cross-section) bar, a rectangular (in cross-section) bar, a round (in cross-section) bar, or a bar of any suitable geometry without limitation. In one embodiment, support bar 77 may comprise metal (e.g., steel, aluminum, or any metal alloy). In some embodiments, support bar may comprise a square metal bar with a nominal side length of between ¼ inch and ½ inch, such as, for example, a ⅜ inch square bar. As shown in FIG. 14B, support bar 77 may be assembled with support features 75 and 76 such that support bar extends generally alongside fence element 24. Such a configuration may provide stable support for cutting system 10 during use.

Figure 15:
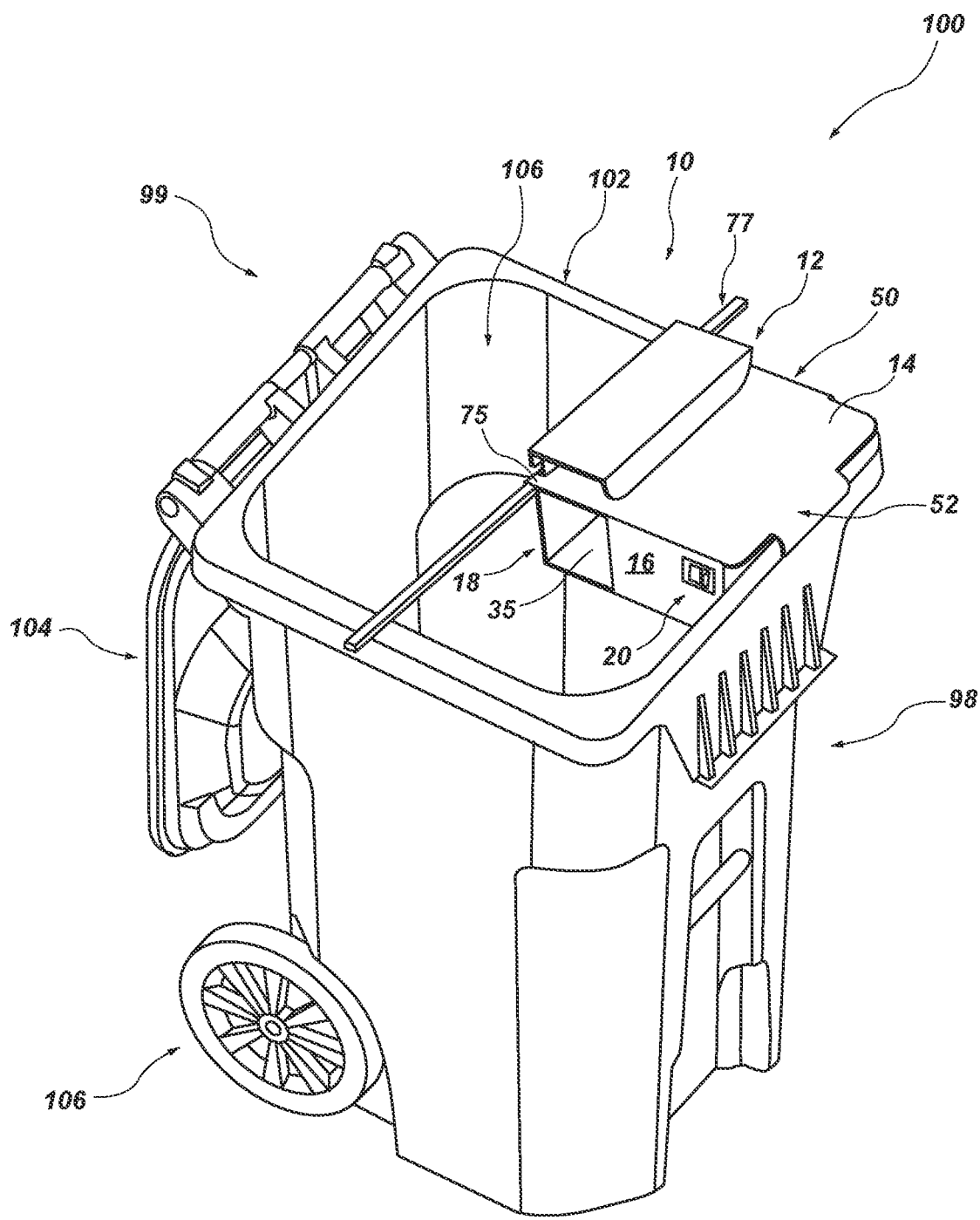
FIG. 15 shows a perspective view of the cutting system and support bar shown in FIG. 14B coupled to a container.

For example, as shown in FIG. 15, assembly 100 includes cutting system 10 (as shown in FIGS. 13 and 14) and container 99. The cutting system 10 shown in FIG. 15 may include one or more element or feature, (e.g., clamp, diverting feature, coupling feature, or any other configuration or structure) described herein, in any combination, without limitation. Container 99 comprises container body 98, wheels 106 (only one shown), and lid 104, which is rotatably connected to body 98 to allow opening and closing of opening 106. Cutting system 100 is coupled to container 99 by way of coupling features 50 and 52, which may be coupled on or about portions of the upper periphery 102 of container body 98, where upper periphery 102 defines opening 106. Coupling features 50/52 may be sized and configured to stabilize cutting system 10, during operation. In addition, support bar 77 may extend across opening 106 of container 99. Accordingly, in some embodiments, support bar 77 may have a length exceeding the portion of opening 106 over which it extends. For example, support bar 77 may have a length of at least 20 inches, at least 24 inches, at least 30 inches, or at least 36 inches. Further, support features 75 and 76 may engage, abut, or otherwise contact support bar 77 such that cutting system 10 is supported. In other embodiments, cutting system 10 may include, for example, clamps (e.g., spring clamps, bar clamps, screw clamps, trigger clamps, or any other suitable clamp) instead of coupling features 50/52, in combination with coupling features 50/52, or in combination with other coupling mechanisms, without limitation.

While various aspects and embodiments have been disclosed herein, other aspects and embodiments are contemplated. The various aspects and embodiments disclosed herein are for purposes of illustration and are not intended to be limiting. Accordingly, other embodiments may be within the scope of the following claims. Additionally, the words "including," "having," and variants thereof (e.g., "includes" and "has") as used herein, including the claims, shall be open-ended and have the same meaning as the word "comprising" and variants thereof (e.g., "comprise" and "comprises").

What is claimed is:

1. A cutting system, comprising:
   a table element;
   a motor;
   a movable blade operably coupled to the motor;
   a blade guard, wherein the blade guard limits a thickness of a material to be cut;
   a diverting element, wherein a portion of the diverting element is positioned above an upper surface of the table element, and
   wherein the diverting element is configured to contact a strip portion of the material to guide the strip portion downward relative to an upper surface of the table element at an angle of between 20 degrees to 80 degrees with respect to the upper surface of the table element.

2. The cutting system according to claim 1, further comprising at least one coupling feature sized and configured to couple the cutting system to a container.

3. The cutting system according to claim 2, wherein the at least one coupling feature comprises at least one movable clamp.

4. The cutting system according to claim 1, wherein the movable blade has a thickness of less than 3/32 of an inch.

5. The cutting system according to claim 4, wherein the movable blade is a circular saw blade or a reciprocating saw blade.

6. The cutting system according to claim 1, further comprising a side cover configured to at least partially restrict access to the movable blade.

7. The cutting system according to claim 1, wherein a diverter proximity relative to the movable blade is less than 2 inches.

8. The cutting system according to claim 7, wherein the diverter proximity relative to the movable blade is less than 1 inch.

9. The cutting system according to claim 1, wherein the angle is between 20 degrees and 60 degrees.

10. The cutting system according to claim 1, wherein the movable blade is a circular saw blade or a reciprocating saw blade.

11. A cutting system, comprising:
    a table element;
    a motor;
    an enclosure at least partially surrounding the motor;
    a movable blade configured to be attached to the motor;
    a diverting element, wherein a portion of the diverting element is positioned above an upper surface of the table element, and
    where the diverting element is sized and configured to contact a strip portion of a material cut by the movable blade to divert the strip portion downward relative to from an upper surface of the table element, such that the strip portion crosses the upper surface of the table element.

12. The cutting system according to claim 11, further comprising at least one coupling feature sized and configured to couple the cutting system to a container.

13. The cutting system according to claim 12, wherein the at least one coupling feature comprises at least one movable clamp.

14. The cutting system according to claim 11, wherein the movable blade has a thickness of less than 3/32 of an inch.

15. The cutting system according to claim 14, wherein the movable blade is a circular saw blade or a reciprocating saw blade.

16. The cutting system according to claim 11, further comprising a side cover configured to at least partially restrict access to the movable blade.

17. The cutting system according to claim 11, wherein a diverter proximity relative to the movable blade is less than 2 inches.

18. The cutting system according to claim 17, wherein the diverter proximity relative to the movable blade is less than 1 inch.

19. The cutting system according to claim 11, wherein the diverting element is configured to guide a strip portion of the material downward relative to an upper surface of the table element at an angle of between 20 degrees and 60 degrees with respect to the upper surface of the table element.

20. A cutting system, comprising:
    a table element;
    a motor;
    a movable blade operably coupled to the motor;
    a blade guard, wherein the blade guard is fixed and limits a thickness of a material to be cut;
    a fence element, wherein the fence element is fixed and limits a width of the material to be cut;
    a diverting element, wherein a portion of the diverting element is positioned above an upper surface of the table element; and
    wherein the diverting element is sized and configured to contact a strip portion of the material to divert the strip portion downward relative to an upper surface of the table element.

* * * * *